United States Patent Office 3,010,820
Patented Nov. 28, 1961

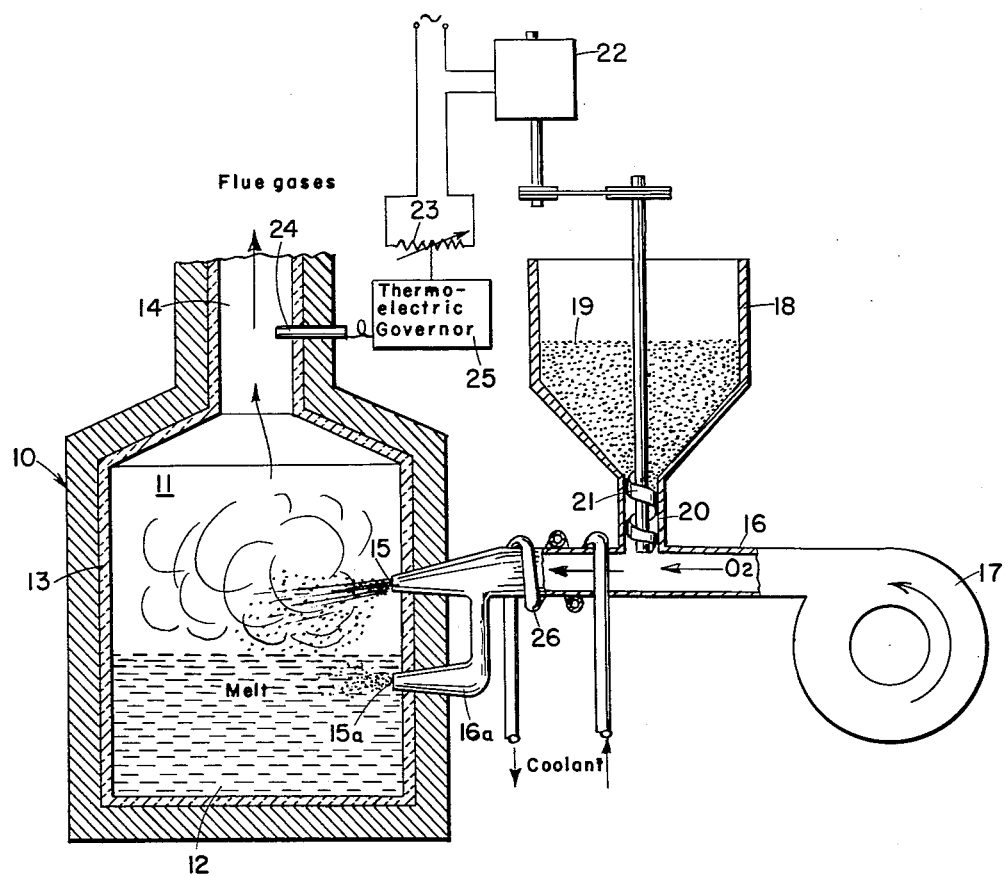

3,010,820
PROCESS FOR REFINING FERROUS MATERIALS
Rudolf Graef and Rudolf Schmolke, Oberhausen, Rhineland, Germany, assignors to Huttenwerk Oberhausen A.G., Oberhausen, Rhineland, Germany, a corporation of Germany
Filed Dec. 1, 1958, Ser. No. 777,429
Claims priority, application Germany Nov. 30, 1957
4 Claims. (Cl. 75—51)

Our present invention relates to metallurgical furnaces in which a ferrous melt is refined with the aid of an oxygen-rich air blast.

In the pneumatic conversion of iron into steel by the conventional Bessemer and Thomas-Gilchrist processes, in which an air blast is directed into the melt through tuyeres located at the bottom of a converter, blasts of high oxygen content cannot be used because the usual tuyere bottoms are not capable of withstanding the intense reactions involved. It is known, however, that blasts of pure or concentrated oxygen may be admitted into the melt at a location above or immediately below its surface, the oxygen thus blown into or onto the melt serving to change the developing carbon monoxide to carbon dioxide with a liberation of considerable amounts of heat. With pig iron of normal carbon content, the quantity of this heat may be as much as about 200,000 kilogram-calories per ton and will exceed the heat generated, for example, in the combustion of phosphorus in the course of the usual Thomas process. A disadvantage of this technique, however, resides in the high temperatures (above 2,000° C.) generated by the reaction of the carbon monoxide with the concentrated oxygen. These temperatures cannot long be sustained by the usual refractory linings of metallurgical furnaces, such as dolomite or magnesite, so that frequent relining of the furnace is required.

Our invention has for its object the provision of a process and apparatus for increasing the life span of metallurgical furnaces, used for the refining of ferrous melts by an oxygen blast, through a reduction of the temperatures accompanying the combustion of the developed carbon monoxide in the reaction chamber.

A feature of the present invention resides in the entrainment of solid particles, e.g. granules of ore or limestone, which serve to absorb some of the developing heat as they pass through the furnace atmosphere and sink into the bath. Advantageously, the oxygen-rich gas entraining the accompanying granules is cooled before it enters the furnace, the proportion of solid matter in the gas stream being preferably adjustable in accordance with the temperature of the furnace.

We have found that a furnace charged with 1 cubic meter (reduced to atmospheric conditions) of oxygen admixed with one kilogram of comminuted solids will operate at a reaction temperature of not more than about 1,600° C.–1,800° C. At these temperatures the refractory furnace linings will perform in an entirely satisfactory manner. Suitable particle sizes for the entrained solids range between 0.1 and 5.0 mm. average diameter, preferably between 0.5 and 2.0 mm. If the particle size is too small, the solids do not drop sufficiently rapidly into the bath and are swept out with the flue gases; they thus do not materially affect the bath temperature and only complicate the problem of purifying these gases. If, on the other hand, the particles are too large, they drop in the bath so rapidly as to reach bottom without having abstracted appreciable amounts of heat from the flame.

In order to insure an adequate heat exchange between the furnace atmosphere and the solids, the latter should remain in that atmosphere for at least 0.1 sec., preferably for longer than 0.5 sec. This requires a relatively low entrance velocity of the blast at the supply nozzles, the latter being preferably designed so that the gas pressure immediately ahead of the nozzles is not greater than about 0.5 atmosphere gauge; a gauge pressure less than 0.1 atmosphere is desirable.

The solids used in accordance with our invention may be derived from quarrying operations, flotation processes, ore-crushing devices and various other installations in which particulate matter is used or produced. Further comminution, e.g. in a pebble mill, is of course possible if the original particle size is too large.

The process of our invention is applicable to rotary and stationary converter, open-hearth furnaces and other types of ovens in which ferrous masses can be melted. A representative embodiment of an apparatus according to the invention is illustrated, somewhat schematically, in the sole figure of the accompanying drawing.

The furnace 10 shown in the drawing comprises an oven chamber 11 containing a ferrous melt 12. Chamber 11 is provided with the usual refractory lining 13 and opens at the top into a flue 14. A plurality of nozzles 15 (only one shown) enter the chamber wall at a level slightly above the surface of melt 12 so that the blast therefrom just skims over the bath. These nozzles are connected, via a tube 16, with a blower system 17 supplying a stream of gas which consists chiefly or solely of oxygen. A hopper 18, containing a charge 19 of limestone particles or other solid comminuted matter, has an outlet 20 opening into tube 16 so that the particles discharged by the hopper are entrained by the gas stream. The rate of this discharge is determined by an automatic feeding device, here shown as a screw 21, which is driven by a motor 22 at a rate controlled by a rheostat 23. A temperature feeler 24 in flue 14 controls the setting of rheostat 23, through the intermediary of a thermo-electric governor 25, in such manner as to increase the delivery of particles 19 to the nozzle 15 in response to an undue rise in the temperature of the flue gases.

A cooling coil 26, traversed by a suitable liquid such as water, surrounds the tube 16 at a location beyond its junction with the outlet 20 of hopper 18. A branch 16a of the tube communicates with a nozzle 15a which enters the melt below the bath surface. Thus, the system shown in the drawing is adapted to inject the oxygen-granule mixture both into the furnace atmosphere and into the melt itself, it being understood that the particles entering the furnace 10 through nozzle 15a (and similar nozzles, not shown, positioned elsewhere along the chamber periphery) will be less effective to reduce the oven temperature than will those reaching the chamber 11 by way of nozzles 15. Naturally, the duct 15a, 16a could also be omitted or, if desired, be connected with tube 16 ahead of hopper 18 so as not to carry the particles 19.

It will be apparent that our invention enables the continuous addition of temperature-lowering solids without any interruption of the refining process. It also serves to increase the efficiency of the furnace operation since the injected particles help transfer some of the heat of the oven gases to the melt while reducing the caloric content of the escaping waste gases.

Our invention is, of course, not limited to the specific embodiment described and illustrated but may be realized in various modifications without departing from the spirit and scope of the appended claims.

We claim:
1. In a process for refining a hot ferrous melt within a reaction chamber, in which a gas stream rich in oxygen is injected into said chamber at a location close to the surface of the melt to burn carbon monoxide developed within said chamber, the improvement which comprises the steps of dividing said gas stream into a first portion which is injected into said chamber above said surface and a second portion which is injected into said chamber below said surface, and admixing with said gas stream a continuous charge of a granular, heat-absorbent solid material of slag-forming character at a rate sufficient to lower the combustion temperature of the carbon monoxide to a maximum of substantially 1800° C.

2. The improvement according to claim 1 wherein said material is selected from the group which consists of ore and limestone.

3. A process according to claim 1 wherein said granular matter consisting of particles having an average diameter ranging between substantially 0.1 and 5.0 mm.

4. A process according to claim 1 wherein said granular material is injected into said chamber above the melt surface with a nozzle pressure equal to between substantially 1.0 and 1.5 atmospheres.

References Cited in the file of this patent

UNITED STATES PATENTS

| | | |
|---|---|---|
| 757,803 | Burrow | Apr. 19, 1904 |
| 1,490,012 | Kapteyn | Apr. 8, 1924 |
| 2,502,259 | Hulme | Mar. 28, 1950 |
| 2,530,078 | Ramsing | Nov. 14, 1950 |
| 2,562,813 | Ogorzaly et al. | July 13, 1951 |
| 2,598,393 | Kalling et al. | May 27, 1952 |
| 2,739,800 | Sisco | Mar. 27, 1956 |
| 2,819,160 | Bannister et al. | Jan. 7, 1958 |
| 2,902,358 | Kalling et al. | Sept. 1, 1959 |